United States Patent
Wilkes

(10) Patent No.: US 11,173,945 B2
(45) Date of Patent: Nov. 16, 2021

(54) STEERING COLUMN ASSEMBLY FOR A VEHICLE

(71) Applicant: ZF Automotive UK Limited, Solihull (GB)

(72) Inventor: Mark Anthony Wilkes, Birmingham (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 17/031,566

(22) Filed: Sep. 24, 2020

(65) Prior Publication Data

US 2021/0094603 A1 Apr. 1, 2021

(30) Foreign Application Priority Data

Sep. 26, 2019 (GB) ...................................... 1913874

(51) Int. Cl.
| | | |
|---|---|---|
| *B62D 1/185* | (2006.01) | |
| *B62D 1/20* | (2006.01) | |
| *B62D 5/00* | (2006.01) | |
| *F16D 3/06* | (2006.01) | |

(52) U.S. Cl.
CPC .............. *B62D 1/185* (2013.01); *B62D 1/20* (2013.01); *B62D 5/006* (2013.01); *F16D 3/06* (2013.01)

(58) Field of Classification Search
CPC .......... B62D 1/185; B62D 1/20; B62D 5/006; F16D 3/06
See application file for complete search history.

(56) References Cited

U.S. PATENT DOCUMENTS

| | | | | |
|---|---|---|---|---|
| 5,709,605 | A | * 1/1998 | Riefe | B62D 1/192 |
| | | | | 464/162 |
| 2013/0075185 | A1 | * 3/2013 | Sugai | B62D 5/001 |
| | | | | 180/402 |
| 2013/0276569 | A1 | * 10/2013 | Davies | B60R 25/023 |
| | | | | 74/492 |
| 2017/0261028 | A1 | * 9/2017 | Wilkes | F16C 29/04 |
| 2018/0297629 | A1 | * 10/2018 | Wang | B62D 5/0424 |
| 2021/0107557 | A1 | * 4/2021 | Wilkes | F16H 1/222 |
| 2021/0107560 | A1 | * 4/2021 | Wilson-Jones | B62D 6/008 |

FOREIGN PATENT DOCUMENTS

| | | | |
|---|---|---|---|
| CN | 11001752 A | 7/2007 | |
| CN | 109455219 A * | 3/2019 | |
| CN | 111806549 A * | 10/2020 | ......... F16H 25/2015 |
| DE | 102011056042 A1 | 6/2013 | |
| FR | 2915949 A1 * | 11/2008 | ............. B62D 1/105 |
| JP | 2010030397 A | 2/2010 | |

* cited by examiner

*Primary Examiner* — Paul N Dickson
*Assistant Examiner* — Scott F. Underwood
(74) *Attorney, Agent, or Firm* — Robert James Harwood

(57) ABSTRACT

A steering column assembly for a vehicle includes a housing, an elongate rotatable steering column, a gear and a torque feedback motor. The elongate rotatable steering column is configured at one end for attachment of a steering wheel and is displaceable into and out of the housing along its longitudinal axis (A). The gear is rotatably mounted coaxially with the steering column within the housing and keyed with the steering column. The torque feedback motor is connected to the gear wherein the keyed connection between the steering column and the gear allows longitudinal displacement of the steering column relative to the gear.

8 Claims, 2 Drawing Sheets

STEERING COLUMN ASSEMBLY FOR A VEHICLE

CROSS-REFERENCE TO RELATED APPLICATION

This application claims priority to UK Patent Application No. 1913874.2 filed Sep. 26, 2019, the disclosure of which is incorporated herein by reference in its entirety.

TECHNICAL FIELD

The present disclosure relates to steering column assemblies for motor vehicles and in particular, but not exclusively, to retractable steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided. It is desirable for the steering wheel of such autonomous vehicles to be moved into a stowed condition during autonomous control of the vehicle in order to maximise the space available within the vehicle and for the steering wheel to be moved into an extended, deployed condition for manual control.

In known steering column assemblies, a steering wheel is attached to one end of an elongate steering column. The angular displacement of the steering column is measured to generate a signal which is used to control the orientation of the steering wheels of the vehicle. The steering column is also connected via gearing to an electric motor (known as a torque feedback unit) in order to provide a sensation of road feel to the driver.

The steering column can be retracted into a housing in order to move the steering wheel into a stowed condition, but such known systems have a limit on retraction which is governed by the available distance between the top of the steering column and the upper side of the gearbox or actuator housing.

SUMMARY

In accordance with the present disclosure, a steering column assembly for a vehicle comprises: a housing, an elongate rotatable steering column, a gear and a torque feedback motor. The elongate rotatable steering column is configured at one end for attachment of a steering wheel and is displaceable into and out of the housing along its longitudinal axis. The gear is rotatably mounted coaxially with the steering column within the housing and keyed with the steering column. The torque feedback motor is connected to the gear. The keyed connection between the steering column and the gear allows longitudinal displacement of the steering column relative to the gear.

By providing a keyed connection between the steering column and the coaxially mounted gear which also allows relative longitudinal displacement, the steering column can retract through the gear which minimises the space required to accommodate the retracted steering column. In addition, the housing acts to guide the steering column and there is therefore no need for an additional guide for the steering column, which both reduces cost and allows a large collapse or retraction length.

Preferably, the steering column and the gear are keyed with each other by means of a splined connection. Preferably, the steering column comprises an externally splined portion engageable with an internally splined portion of the gear.

The steering column may be mounted within an elongate steering column housing which is displaceable relative to the assembly housing in the longitudinal direction of the steering column. Preferably, the steering column housing is slidably mounted in the assembly housing. The assembly housing may further comprise an aperture through which the steering column can project. The steering column assembly may further comprise a turns limiter. The steering column may comprise a threaded portion, a nut threadedly mounted on the threaded portion of the steering column and being prevented from rotating, and end stops at the ends of the threaded portion of the steering column.

BRIEF DESCRIPTION OF THE DRAWINGS

By way of example only, a specific embodiment of the present disclosure will now be described with reference to the accompanying drawings, in which.

DETAILED DESCRIPTION

Figure 1:
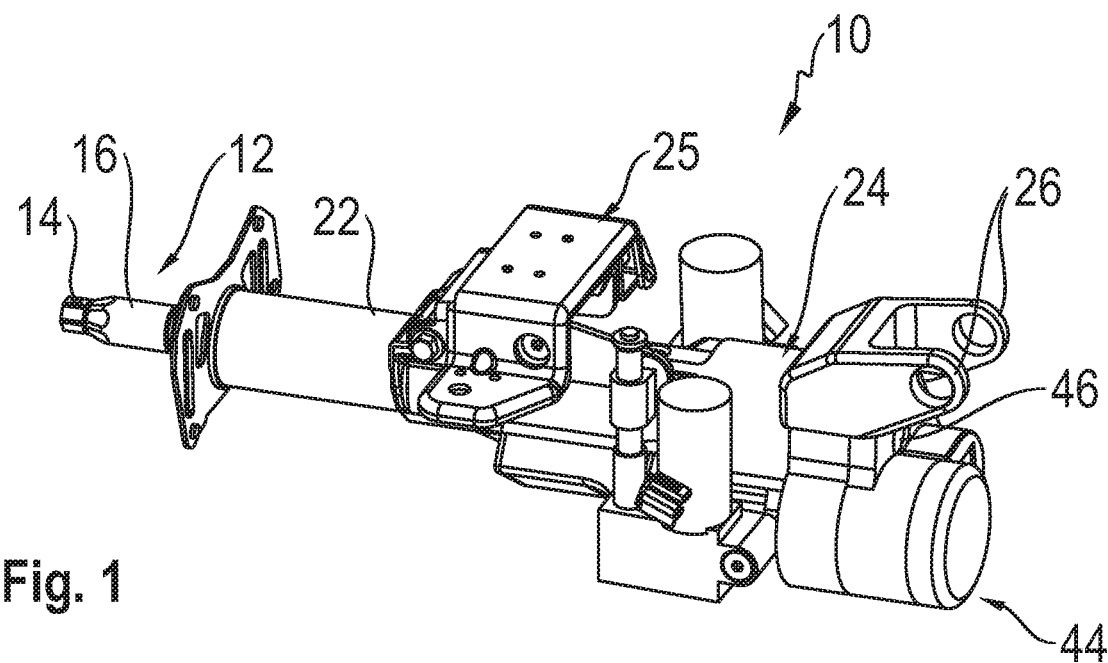
FIG. 1 is a perspective view of an embodiment of steering column assembly for a vehicle, shown in an extended configuration.

A steering column assembly 10 for a vehicle comprises an elongate rigid steering column 12 to one end 14 of which a steering wheel (not shown) is connected in use. The steering column 12 comprises a longitudinally outer elongate portion 16 to which the steering wheel is attached in use, a longitudinally central externally threaded portion 18 and a longitudinally inner portion 20, the outer surface of the inner portion 20 being provided with a plurality of identical, longitudinally-extending splines. The outer, central and inner portions 16, 18, 20 of the steering column 12 are secured together so that they rotate with one another.

The steering column 12 is mounted within an elongate tubular steering column housing 22 which is slidably received in a complementarily shaped recess in an assembly housing 24. The column housing 22, and therefore the steering column 12, are constrained to be displaceable along the longitudinal axis A of the steering column 12. The housing is provided with a front mounting bracket 25 and two rear mounting lugs 26, which do not form part of the present disclosure, for mounting the steering column assembly to a vehicle.

Figure 2:
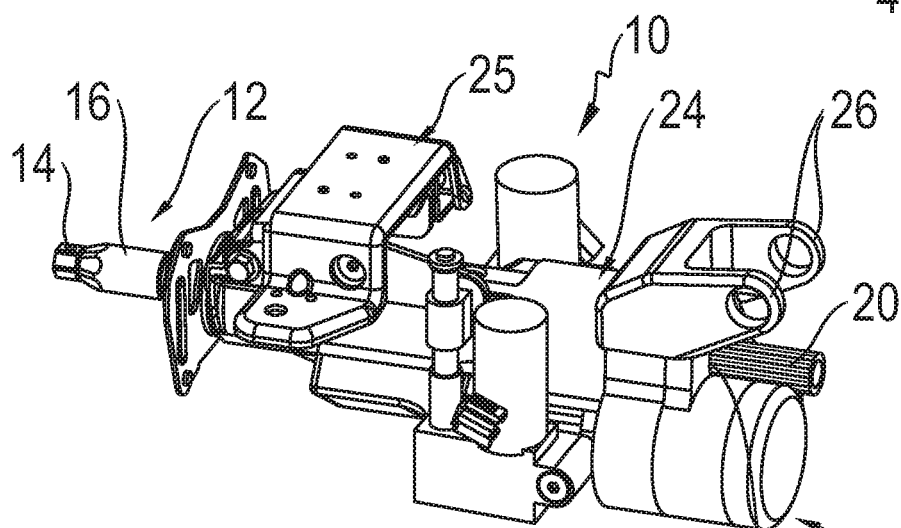
FIG. 2 is a perspective view of the steering column assembly of FIG. 1, shown in a retracted configuration.
Figure 3:
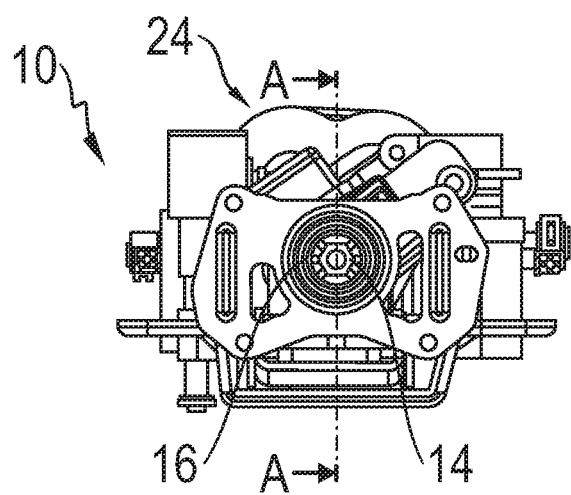
FIG. 3 is a front view of the steering column assembly of FIG. 1.

By displacing the steering column housing 22, the steering column 12, and hence the steering wheel which would normally be attached to the end 14 of the steering column 12, the steering wheel assembly can be adjusted between a deployed configuration shown in FIG. 1 in a manual "steer by wire" mode and a stowed condition shown in FIG. 2 in an autonomous driving mode. The steering column housing 22 is displaceable with respect to the assembly housing 24 by a displacement means (not shown), which do not form part of the present disclosure.

Figure 4:
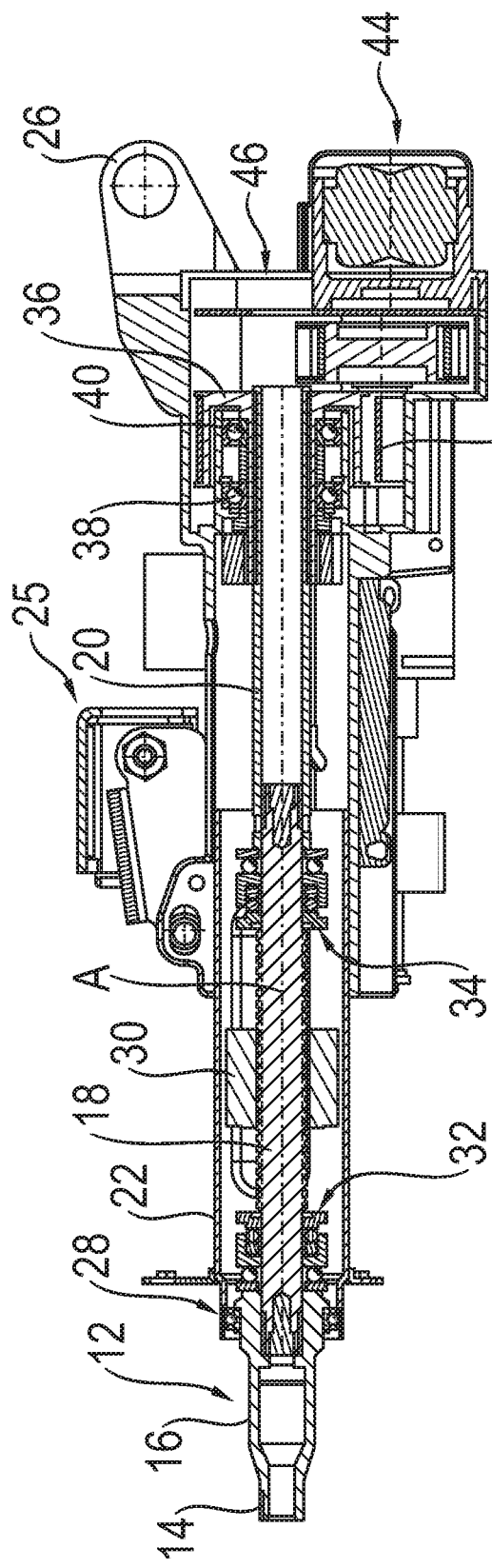
FIG. 4 is a vertical cross-section through the steering column assembly of FIG. 1, shown in the extended configuration.
Figure 5:
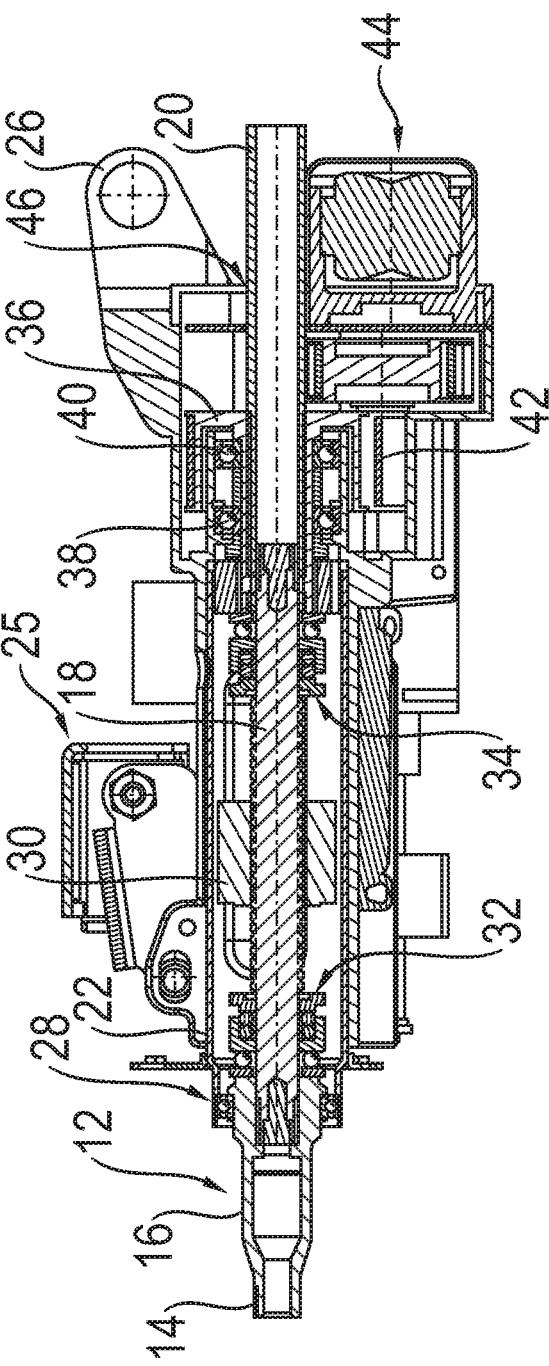
FIG. 5 is a vertical cross-section through the steering column assembly of FIG. 1, shown in the retracted configuration.

As best seen in FIGS. 4 and 5, the outer portion 16 of the steering column 12 is mounted at the outer end of the tubular column housing 22 by means of a bearing 28. The central threaded portion 18 of the steering column 12 forms a lead screw on which a lead screw nut 30 is threadedly received. The lead screw nut 30 is slidably disposed within the tubular column housing 22 and is prevented from rotating with respect to it. Consequently, rotation of the steering column 12 causes the lead screw nut 30 to be displaced longitudinally along the threaded central portion 18 of the steering column 12. The maximum longitudinal displacement in each direction is determined by end stops 32, 34 at opposite ends of the threaded portion 18, thereby forming a mechanical limiter for limiting the rotation of the steering column 12 (and hence a steering wheel connected to the steering column 12) in both directions.

The splined inner portion 20 of the steering column 12 is received and keyed in a complementarily internally splined pulley 36. The internally splined pulley 36 is mounted by means of bearings 38, 40 within the housing 24, and thus the splined inner portion 20 of the steering column 12 is supported within the housing. A drive belt 42 passes around the outer surface of the internally splined pulley 36 and is driven via a gear train (not shown) by an electric motor 44 which forms a torque feedback unit which, in a known manner, provides a sensation of road feel to a driver as the steering wheel and steering column 12 are rotated.

In the deployed configuration shown in FIGS. 1 and 4, rotation of the steering column 12 by a driver turning a steering wheel during a "steer by wire" mode results in rotation of the internally splined pulley 36, whose rotation is transmitted to the electric motor 44 which provides a feedback force to give a sensation of road feel to the driver.

In the stowed condition shown in FIGS. 2 and 5, the steering column housing 22 is withdrawn into the housing 24, which results in longitudinal displacement of the steering column 12. However, the splined portion 20 is able to move longitudinally with respect to the complementarily internally splined pulley 36 whilst still being engaged and keyed with it. In its maximum withdrawn position, the 12 projects out of an aperture 46 in the rear face of the housing 24.

By providing a splined connection between the steering column 12 and the pulley 36 connected to the torque feedback unit (the electric motor 44), the steering column 12 can be fully withdrawn to its stowed position very efficiently, simplifying the packaging requirements for the assembly.

The disclosure is not restricted to the details of the foregoing embodiment. For example, although the specific description refers to the use of a splined connection between the steering column 12 and the pulley 36, other forms of connection which allow relative longitudinal displacement between the steering column 12 and the pulley 36 could be used instead, for example keyways on the steering column 12 and the pulley 36, and the term "splined" as used herein is intended to include any form of connection which allows such relative longitudinal displacement.

What is claimed is:

1. A steering column assembly for a vehicle, comprising:
    a housing;
    an elongate rotatable steering column configured at one end for attachment of a steering wheel and being displaceable into and out of the housing along its longitudinal axis;
    a gear rotatably mounted coaxially with the steering column within the housing and keyed with the steering column; and
    a torque feedback motor connected to the gear;
    wherein the keyed connection between the steering column and the gear allows longitudinal displacement of the steering column relative to the gear.

2. A steering column assembly as defined in claim 1, wherein the steering column and the gear are keyed with each other by means of a splined connection.

3. A steering column assembly as defined in claim 2, wherein the steering column comprises an externally splined portion engageable with an internally splined portion of the gear.

4. A steering column assembly as defined in claim 3, wherein the steering column is mounted within an elongate steering column housing which is displaceable relative to the assembly housing in the longitudinal direction of the steering column.

5. A steering column assembly as defined in claim 4, wherein the steering column housing is slidably mounted in the assembly housing.

6. A steering column assembly as defined in claim 5, wherein the assembly housing comprises an aperture through which the steering column can project.

7. A steering column assembly as defined in claim 6, further comprising a turns limiter.

8. A steering column assembly as defined in claim 7, wherein the steering column comprises a threaded portion, a nut threadedly mounted on the threaded portion of the steering column and being prevented from rotating, and end stops at the ends of the threaded portion of the steering column.

* * * * *